United States Patent
Blumenstock et al.

(10) Patent No.: US 6,651,423 B1
(45) Date of Patent: Nov. 25, 2003

(54) METHOD FOR OPERATING A STORAGE CATALYST OF AN INTERNAL COMBUSTION ENGINE

(75) Inventors: Andreas Blumenstock, Ludwigsburg (DE); Klaus Winkler, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/169,450

(22) PCT Filed: Nov. 24, 2000

(86) PCT No.: PCT/DE00/04168

§ 371 (c)(1),
(2), (4) Date: Oct. 4, 2002

(87) PCT Pub. No.: WO01/49992

PCT Pub. Date: Jul. 12, 2001

(30) Foreign Application Priority Data

Dec. 31, 1999 (DE) .......................... 199 63 927

(51) Int. Cl.[7] ................................. F01N 3/00
(52) U.S. Cl. .................. 60/277; 60/274; 60/276; 60/295; 60/297
(58) Field of Search .................. 60/274, 276, 277, 60/285, 295, 297

(56) References Cited

U.S. PATENT DOCUMENTS

| 5,154,055 | A | * | 10/1992 | Nakane et al. | 60/276 |
| 5,157,921 | A | * | 10/1992 | Ito et al. | 60/274 |
| 6,003,307 | A | * | 12/1999 | Naber et al. | 60/274 |
| 6,502,388 | B2 | * | 1/2003 | Takaku et al. | 60/285 |
| 6,553,754 | B2 | * | 4/2003 | Meyer et al. | 60/277 |

FOREIGN PATENT DOCUMENTS

| EP | 0 858 837 | 8/1998 |
| EP | 0 943 792 | 9/1999 |

* cited by examiner

Primary Examiner—Thomas Denion
Assistant Examiner—Binh Tran
(74) Attorney, Agent, or Firm—Kenyon & Kenyon

(57) ABSTRACT

An internal combustion engine in particular for a motor vehicle is described, which is provided with a storage catalytic converter, which is filled with and emptied of nitrogen oxides. Using the control unit, a plurality of aging conditions of the storage catalytic converter can be determined. Using the control unit, a reversible aging curve and a non-reversible aging curve can be determined from the aging conditions.

14 Claims, 2 Drawing Sheets

METHOD FOR OPERATING A STORAGE CATALYST OF AN INTERNAL COMBUSTION ENGINE

FIELD OF THE INVENTION

The present invention relates to a method for operating a storage catalytic converter of an internal combustion engine in particular of a motor vehicle, in which the storage catalytic converter is filled with and emptied of nitrogen oxide. The present invention also relates to a control unit for an internal combustion engine, in particular a motor vehicle, as well as to an internal combustion engine, in particular for a motor vehicle.

BACKGROUND INFORMATION

A method of this type, a control unit of this type, and an internal combustion engine of this type are familiar, for example, in a so-called direct fuel-injection system. In that context, the fuel is injected into the combustion chamber of the internal combustion engine, in homogeneous operation, during the intake phase or, in stratified operation, during the compression phase. Homogeneous operation is advantageously provided for the full-load operation of the internal combustion engine, whereas stratified operation is suited for idling and partial-load operation. By way of example, in a direct-injection internal combustion engine of this type, the switchover between the aforementioned operating modes is carried out as a function of the requested torque.

In particular, in order to carry out stratified operation, a storage catalytic converter is used to temporarily store the nitrogen oxides that are generated, so as to reduce them in a three-way catalytic converter during a succeeding homogeneous operation. This storage catalytic converter is filled with nitrogen oxides in stratified operation and is emptied once again in homogeneous operation. This filling and emptying leads to an aging of the storage catalytic converter and therefore to a diminution of its storage capacity.

SUMMARY OF THE INVENTION

It is the objective of the present invention to create a method for operating a storage catalytic converter of an internal combustion engine, which makes it possible to detect the aging of the storage catalytic converter.

This objective is achieved in a method of the aforementioned type in accordance with the present invention, in that a plurality of aging conditions of the storage catalytic converter are determined, and in that, from the aging conditions, a reversible aging curve and a nonreversible aging curve are determined. In a control unit and an internal combustion engine of the aforementioned types, the objective is achieved accordingly.

The reversible aging curve represents a decrease, caused by sulfur, in the storage capacity of the storage catalytic converter. The sulfur can be contained, for example, in the fuel or at least in the exhaust gas arising in the internal combustion engine. The non-reversible aging curve represents a natural decrease, caused by use, in the storage capacity of the storage catalytic converter. This decrease occurs in particular as a result of the thermal stress on the catalytic converter after an appropriately long service life.

By determining the reversible and the non-reversible aging curves, the distinction can be precisely made by the control unit, as to whether a regeneration of the storage catalytic converter is possible, or whether the storage catalytic converter is actually used up. As a result, it can be avoided that a storage catalytic converter that can actually be regenerated is recognized as defective and, for example, is replaced.

In one advantageous refinement of the present invention, the reversible aging curve is determined from the sequential aging conditions between two regenerations of the storage catalytic converter. In addition, the non-reversible aging curve is determined from the aging conditions after each regeneration of the storage catalytic converter. Therefore, it is possible in a simple manner to distinguish the different aging curves from each other.

It is especially advantageous if, for distinguishing the reversible and the non-reversible aging curves, the slope of the reversible aging curve is compared to the slope of the non-reversible aging curve. In this context, the slope of the reversible aging curve is greater than the slope of the non-reversible aging curve. In this way, a reliable differentiation of the two aging curves is assured.

In one advantageous embodiment of the present invention, the storage catalytic converter is regenerated after a specifiable reversible aging condition has been reached. Thus it is assured that the storage catalytic converter will not be replaced on account of a reversible aging, but it will be regenerated instead.

In a further advantageous embodiment of the present invention, the storage catalytic converter is recognized as defective when a specifiable non-reversible aging condition has been attained. Therefore, the storage catalytic converter is only recognized as defective when it can no longer, or only slightly, be regenerated. The replacement of the storage catalytic converter is therefore avoided until the non-reversible aging curve reaches a specifiable threshold value.

Of particular importance is the realization of the method according to the present invention in the form of a control element, which is provided for a control unit of an internal combustion engine, in particular of a motor vehicle. In this context, a program that can be executed on a computing device, in particular on a microprocessor and that is suitable for carrying out the method according to the present invention is stored on the control element. In this case, the present invention is realized using a program that is stored on the control element, so that this control element, which is provided with a program, represents the present invention in the same way as the method which the program is designed to carry out. As the control element, an electrical storage medium can especially be used, for example, a read-only memory or a flash memory.

Further features, application possibilities, and advantages of the present invention can be derived from the following description of exemplary embodiments of the present invention, which are depicted in the Figures of the drawing. In this context, all the features described or depicted, by themselves or in any combination, constitute the subject matter of the present invention and independent of their formulation in the description or depiction in the drawing.

DETAILED DESCRIPTION

Figure 1:
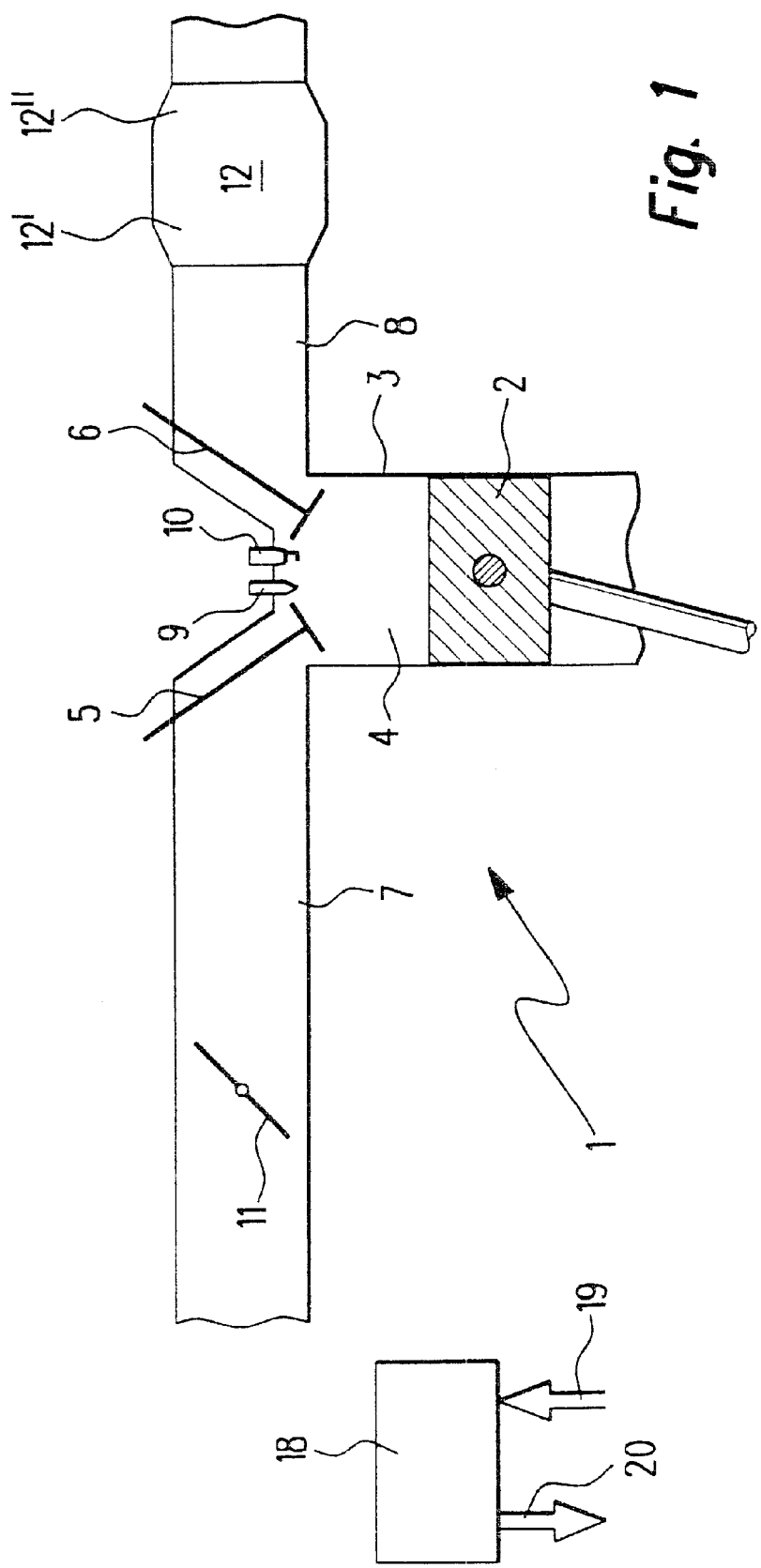
FIG. 1 depicts a schematic representation of an exemplary embodiment of an internal combustion engine according to the present invention.

In FIG. 1, an internal combustion engine 1 of a motor vehicle is depicted, in which a piston 2 can move back and forth in a cylinder 3. Cylinder 3 is furnished with a combustion chamber 4, which, inter alia, is bordered by piston 2, an intake valve 5, and an outlet valve 6. Coupled to intake valve 5 is an intake pipe 7, and coupled to outlet valve 6 is an exhaust gas pipe 8.

In the area of intake valve 5 and of outlet valve 6, an injection valve 9 and a spark plug 10 extend into combustion chamber 4. Via injection valve 9, fuel can be injected into combustion chamber 4. Using spark plug 10, the fuel in combustion chamber 4 can be ignited.

Accommodated in intake pipe 7 is a rotatable throttle valve 11, through which air can be conveyed to intake pipe 7. The quantity of the air supplied is a function of the angular position of throttle valve 11. Accommodated in exhaust gas pipe 8 is a catalytic converter 12, which functions to purify the exhaust gases that arise as a result of the combustion of the fuel.

Catalytic converter 12 is a storage catalytic converter 12', which is combined with a three-way catalytic converter 12". Catalytic converter 12 is therefore provided, inter alia, to temporarily store nitrogen oxides (NOx).

A control unit 18 is acted upon by input signals 19, which represent operating quantities of internal combustion engine 1 as measured by sensors. Control unit 18 generates output signals 20, which, via actuators, or controllers, can influence the behavior of internal combustion engine 1. Control unit 18 is provided, inter alia, so as to control and/or to regulate the operating quantities of internal combustion engine 1. For this purpose, control unit 18 is provided with a microprocessor, which, in a storage medium, in particular in a flash memory, has a stored program which is suited to carrying out the aforementioned control and/or regulation.

In a first mode of operation, the so-called homogeneous operation of internal combustion engine 1, throttle valve 11 is partially opened, or closed, as a function of the desired torque. The fuel, during an intake phase brought about by piston 2, is injected from injection valve 9 into combustion chamber 4. The injected fuel is swirled around by the air that is simultaneously taken in via throttle valve 11 and is therefore essentially uniformly distributed in combustion chamber 4. Thereupon, the fuel/air mixture is compressed during the compression phase, so as then to be ignited by spark plug 10. As a result of the expansion of the ignited fuel, piston 2 is driven. In homogeneous operation, the resulting torque is a function, inter alia, of the position of throttle valve 11. With a view to the minimal production of pollution emissions, the fuel/air mixture is thus set, as far as possible, at lambda equals one.

In a second mode of operation, the so-called stratified operation of internal combustion engine 1, throttle valve 11 is opened wide. The fuel, during a compression phase brought about by piston 2, is injected from injection valve 9 into combustion chamber 4, in such a way so as to be, spatially, in the immediate vicinity of spark plug 10 and, temporally, at an appropriate interval before the ignition time point. Then, using spark plug 10, the fuel is ignited, so that piston 2, in the working phase that now follows, is driven by the expansion of the ignited fuel. In stratified operation, the resulting torque is largely a function of the injected mass of fuel. Essentially, stratified operation is provided for idle running and for the partial-load operation of internal combustion engine 1.

During stratified operation, storage catalytic converter 12' of catalytic converter 12 is filled with nitrogen oxides. In a subsequent homogeneous operation, storage catalytic converter 12' is emptied, and the nitrogen oxides are reduced by three-way catalytic converter 12'.

Storage catalytic converter 12' during the continuing filling and emptying of nitrogen oxides, accumulates sulfur over time. This leads to a reduction in the storage capacity of storage catalytic converter 12', which hereinafter is termed aging.

Figure 2:
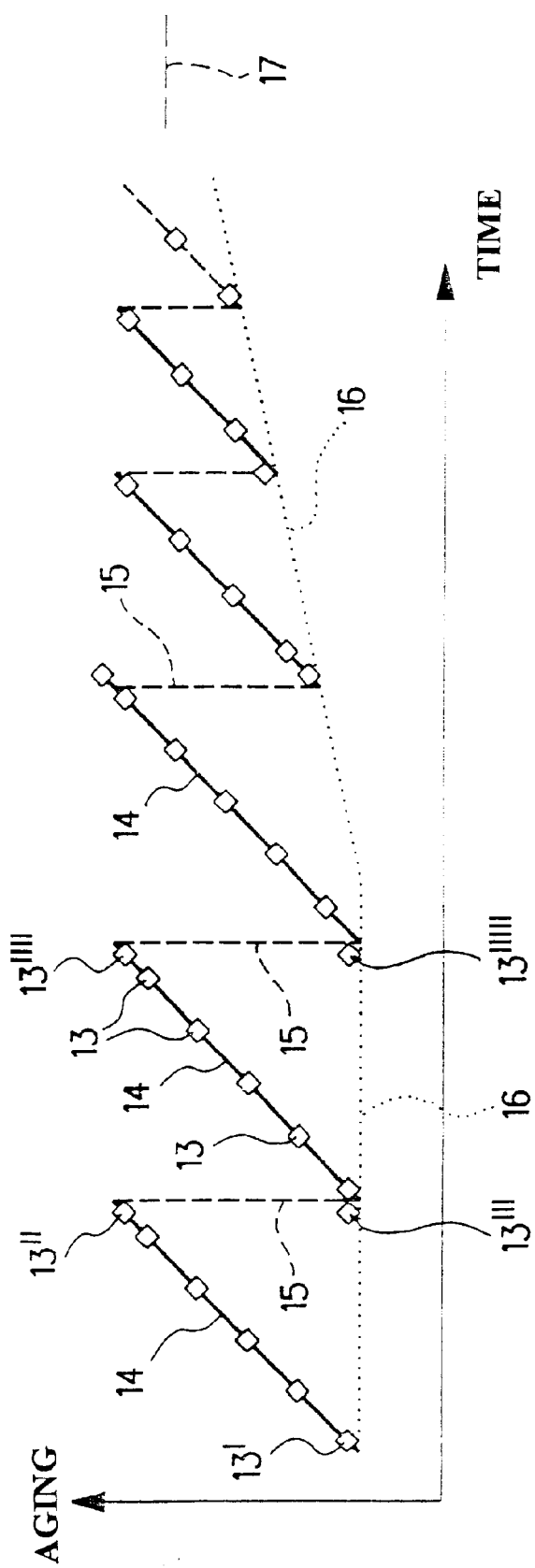
FIG. 2 depicts a schematic diagram of the aging of the storage catalytic converter of the internal combustion engine of FIG. 1.

In FIG. 2, the aging of the support catalytic converter 12' is plotted over time. A value for this aging can be determined by control unit 18 through appropriate diagnostic procedures. Diagnostic procedures of this type can be based on, for example, the measurement of NOx emissions downstream of storage catalytic converter 12'.

In FIG. 2, the implementation of diagnostic procedures of this type, and the resulting value of aging, is designated in each case by a point 13. These aging conditions of points 13 are connected to each other by a continuous line 14. Line 14 therefore represents an aging curve.

A first point 13' represents the first implementation of a diagnosis of storage catalytic converter 12', thus determining a first aging condition. In succeeding time points, further diagnoses are carried out, yielding further aging conditions. In this context, these further aging conditions, due to their ever increasing values, yield an aging curve that corresponds to an aging of storage catalytic converter 12'. As was already mentioned, the storage capacity of storage catalytic converter 12' is reduced as a result of the aging.

In a point 13", an aging condition is then attained on the basis of which a sulfur regeneration of storage catalytic converter 12' is carried out by control unit 18. This sulfur regeneration is indicated in FIG. 2 by a dotted line 15 and can be achieved, for example, by a rich operating state of internal combustion engine 1 at simultaneously high exhaust-gas temperatures. In this regeneration, the sulfur is removed from storage catalytic converter 12'. This substantially restores storage catalytic converter 12' to its original state, in particular, to its original storage capacity. This is represented in FIG. 2 by point 13''', which roughly corresponds to the original aging condition of storage catalytic converter 12'.

Thereupon, the aforementioned diagnostic procedures are once again carried out by control unit 18, leading to further points 13 and therefore to a further line 14. In a point 13"", a regeneration of storage catalytic converter 12' is once again carried out by control unit 18 in accordance with line 15, leading in turn to a point 13""' and thus essentially to the attainment of the original storage capacity of the storage catalytic converter.

As was mentioned, the previously discussed aging arises due to the buildup of sulfur in storage catalytic converter 12'. In this context, the sulfur can be in the fuel that is supplied to internal combustion engine 1, or in the exhaust gas that arises therefrom. This aging is reversible and can be substantially eliminated by the described regeneration.

In addition to the aforementioned reversible aging, storage catalytic converter 12' is also subject to a non-reversible aging. This comes about due to the continual filling and emptying of storage catalytic converter 12' and ultimately represents the actual, natural aging of storage catalytic converter 12'.

In FIG. 2, the natural, non-reversible aging is represented by a line 16. This line 16 results from points 13', 13''', 13''''', etc., i.e., always from those aging conditions that storage catalytic converter 12' has immediately after a sulfur regeneration.

As can be seen in FIG. 2, line 16 slowly rises beginning at point 13''''. The slope of line 16, in this context, is substantially less than the slope of lines 14. The gradient of line 16 is synonymous with a lasting, ever decreasing storage capacity of storage catalytic converter 12'. This is also shown by the fact that the restoration of the storage capacity of storage catalytic converter 12' through a sulfur regeneration, i.e., ultimately the length of lines 15, becomes less and less.

As was mentioned, the loss of storage capacity of storage catalytic converter 12', which can be seen from the rising line 16, is not reversible. This has as a consequence the fact that the storage capacity over the long term approaches zero. Then storage catalytic converter 12' is replaced.

As was also mentioned, the slope of line 16 of the natural, non-reversible aging is substantially less than the slope of lines 14 of the sulfur-caused, reversible aging. As a result of these differing slopes, control unit 18 can distinguish the natural, non-reversible aging from the sulfur-caused, reversible aging.

In control unit 18, a threshold value 17 is stored, which can be stipulated, for example, as a function of points 13", 13"", etc., i.e., ultimately as a function of the aging conditions present immediately before a regeneration. If line 16 reaches this threshold value 17, then control unit 18 recognizes that storage catalytic converter 12' is no longer serviceable. This is indicated to the user of internal combustion engine 1, or to a garage, by control unit 18.

On the basis of the differentiation of lines 14 and line 16 by control unit 18, a defect message of storage catalytic converter 12' due to a reversible aging is avoided, even if one point 13 of one of lines 14 exceeds threshold value 17.

What is claimed is:

1. A method for operating a storage catalytic converter of an internal combustion engine, in which the storage catalytic converter is filled with and emptied of nitrogen oxide, comprising:

determining a plurality of aging conditions of the storage catalytic converter;

determining a reversible aging curve and a non-reversible aging curve from the aging conditions; and in order to distinguish the reversible aging curve from the non-reversible aging curve, comparing a slope of the reversible aging curve to a slope of the non-reversible aging curve.

2. The method as recited in claim 1, wherein the internal combustion engine is of a motor vehicle.

3. The method as recited in claim 1, wherein the reversible aging curve is determined from successive ones of the aging conditions between two regenerations of the storage catalytic converter.

4. The method as recited in claim 1, wherein the non-reversible aging curve is determined from the aging conditions, in each case, after a sulfur regeneration of the storage catalytic converter.

5. The method as recited in claim 1, wherein the aging conditions are determined as a function of a nitrogen oxide emission downstream of the storage catalytic converter.

6. The method as recited in claim 1, further comprising regenerating the storage catalytic converter after a specifiable reversible aging condition is attained.

7. The method as recited in claim 1, further comprising:

recognizing the storage catalytic converter as defective after a specifiable non-reversible aging condition is attained.

8. A control element for use in a control unit and on which a program is stored that when executed on a computing element achieves a performance of:

determining a plurality of aging conditions of the storage catalytic converter;

determining a reversible aging curve and a non-reversible aging curve from the aging conditions; and in order to distinguish the reversible aging curve from the non-reversible aging curve, comparing a slope of the reversible aging curve to a slope of the non-reversible aging curve.

9. The control element according to claim 7, wherein the control element includes a flash memory.

10. The control element according to claim 7, wherein the computing element includes a microprocessor.

11. A control unit for an internal combustion engine having a storage catalytic converter that can be filled with and emptied of a nitrogen oxide, comprising:

an arrangement for determining a plurality of aging conditions of the storage catalytic converter;

an arrangement for determining a reversible aging curve and a non-reversible aging curve from the aging conditions; and in order to for distinguish the reversible aging curve from the non-reversible aging curve, an arrangement for comparing a slope of the reversible aging curve to a slope of the non-reversible aging curve.

12. The control unit according to claim 10, wherein the internal combustion engine is of a motor vehicle.

13. An internal combustion engine having a storage catalytic converter that can be filled with and emptied of a nitrogen oxide, and having a control unit that includes:

an arrangement for determining a plurality of aging conditions of the storage catalytic converter;

an arrangement for from the aging conditions, determining a reversible aging curve and a non-reversible aging curve; and in order to distinguish the reversible aging curve from the non-reversible aging curve, an arrangement for comparing a slope of the reversible aging curve to a slope of the non-reversible aging curve.

14. The internal combustion engine according to claim 12, wherein the internal combustion engine is of a motor vehicle.

* * * * *